United States Patent
Park

(10) Patent No.: US 10,009,522 B2
(45) Date of Patent: Jun. 26, 2018

(54) MULTIFUNCTIONAL INTEGRATION MODULE FOR MOUNTING IN REAR OF VEHICLE

(71) Applicant: HYUNDAI MOTOR COMPANY, Seoul (KR)

(72) Inventor: Joong Hyun Park, Osan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 233 days.

(21) Appl. No.: 14/829,555

(22) Filed: Aug. 18, 2015

(65) Prior Publication Data

US 2016/0119518 A1 Apr. 28, 2016

(30) Foreign Application Priority Data

Oct. 24, 2014 (KR) .................. 10-2014-0144818

(51) Int. Cl.
| | | |
|---|---|---|
| *H04N 7/18* | (2006.01) | |
| *H04N 5/225* | (2006.01) | |
| *B60R 11/04* | (2006.01) | |
| *B60Q 1/56* | (2006.01) | |
| *B60Q 1/26* | (2006.01) | |

(52) U.S. Cl.
CPC .......... *H04N 5/2253* (2013.01); *B60R 11/04* (2013.01); *H04N 5/2257* (2013.01); *B60Q 1/2661* (2013.01); *B60Q 1/56* (2013.01)

(58) Field of Classification Search
None
See application file for complete search history.

(56) References Cited

U.S. PATENT DOCUMENTS

| | | | | |
|---|---|---|---|---|
| 2007/0216770 A1* | 9/2007 | Chang | .................. | B60Q 1/0023 348/148 |
| 2009/0129112 A1* | 5/2009 | Shamitz | .................... | B60Q 1/56 362/549 |
| 2009/0153663 A1* | 6/2009 | Ramos | ...................... | B60R 1/00 348/148 |
| 2014/0168437 A1* | 6/2014 | Rother | .................... | B60R 11/04 348/148 |

(Continued)

FOREIGN PATENT DOCUMENTS

| | | |
|---|---|---|
| JP | 03-121535 U | 5/2006 |
| JP | 2006-232017 A | 9/2006 |

(Continued)

*Primary Examiner* — Chikaodili E Anyikire
(74) *Attorney, Agent, or Firm* — McDermott Will & Emery LLP

(57) ABSTRACT

A multifunctional integration module for mounting in rear of a vehicle has a structure in which a rear view camera, a trunk open switch, license lamps, and the like are integrated. The multifunctional integration module includes an integration module case which is mounted, being exposed to the outside, in the rear of the vehicle and is integrally mounted with a rear view camera, a trunk open switch, and license lamps in a predetermined arrangement. The rear view camera is fixedly mounted in the integration module case while exposing a lens through a front of the integration module case, The trunk open switch is pressedly mounted on a bottom surface of the integration module case. The license lamps are mounted at sides of the integration module case to irradiate light.

7 Claims, 6 Drawing Sheets

(56) References Cited

U.S. PATENT DOCUMENTS

| | | | | |
|---|---|---|---|---|
| 2014/0207344 A1* | 7/2014 | Ihlenburg | ............... | E05F 15/73 |
| | | | | 701/49 |
| 2015/0336521 A1* | 11/2015 | Tofilescu | ............. | B60R 16/023 |
| | | | | 382/104 |
| 2016/0107571 A1* | 4/2016 | Dellock | ................. | B60R 11/04 |
| | | | | 348/148 |

FOREIGN PATENT DOCUMENTS

| JP | 2009-090767 A | 4/2009 |
|---|---|---|
| JP | 2011-105129 A | 6/2011 |
| KR | 10-2009-0043855 A | 5/2009 |
| KR | 10-2010-0046664 A | 5/2010 |
| KR | 10-2011-0044451 A | 4/2011 |
| KR | 10-2012-0053914 A | 5/2012 |

\* cited by examiner

MULTIFUNCTIONAL INTEGRATION MODULE FOR MOUNTING IN REAR OF VEHICLE

CROSS-REFERENCE TO RELATED APPLICATION

This application claims under 35 U.S.C. § 119(a) the benefit of Korean Patent Application No. 10-2014-0144818 filed on Oct. 24, 2014, in the Korean Intellectual Property Office, the entire contents of which are incorporated herein by reference.

TECHNICAL FIELD

The present disclosure relates to a multifunctional integration module for mounting in rear of a vehicle. More particularly, it relates to a multifunctional integration module for mounting in rear of a vehicle having a structure in which a rear view camera, a trunk open switch, a license lamp, and the like are integrated into one.

BACKGROUND

At the rear of a vehicle, a license lamp for identifying a license plate at night, a trunk open switch, a rear view camera photographing a rear area of the vehicle, and the like are mounted in a predetermined arrangement.

Referring to the accompanying FIGS. 1 and 2, the license lamps 10 are mounted on upper ends of the license plate attached to a trunk lid or a tail gate of the vehicle, having bilateral symmetry. The trunk open switch 12 is mounted at a middle portion between the license lamps 10. The rear view camera 14 is mounted between the license lamps 10 and the trunk open switch 12.

As such, as the license lamp, the rear view camera, the trunk open switch, and the like are separately mounted in the trunk lid or the tail gate, each component needs to be assembled at the time of in-line assembly, such that assembly man-hour cannot but be increased.

In particular, as illustrated in the accompanying FIG. 3, wirings for electrical signal connection of the license lamps 10, the rear view camera 14, and the trunk open switch 12, respectively, may have a complicated connection structure, and as a result, manufacturing costs and assembly working time cannot but be increased.

In addition, the license lamps, the rear view camera, the trunk open switch, and the like occupy different mounting spaces in the rear of the vehicle, and therefore the freedom of design of the trunk lid or the tail gate for the mounting space thereof may be reduced.

When the trunk open switch is mounted at a middle position (e.g., middle position in a width direction of a vehicle body) between the pair of license lamps, the rear view camera cannot but be mounted between one license lamps and the trunk open switch, and therefore as illustrated in FIG. 2, the rear view camera 14 cannot but be mounted, being biased from the middle position in the width direction of the vehicle body to one side. As a result, an asymmetrical mounting structure of the rear view camera 14 which is exposed to the outside of the vehicle may reduce the aesthetic appearance.

Similarly, even when the rear view camera is mounted at the middle position (e.g., middle position in the width direction of the vehicle body) between the pair of license lamps, and the trunk open switch is mounted between one license lamp and the rear view camera, the trunk open switch cannot but be asymmetrically mounted.

Since the trunk open switch is covered so as not to be exposed to the outside due to a rear garnish to improve aesthetic appearance, a user cannot find the trunk open switch at the rear of the vehicle visually, and therefore asymmetrical mounting of the trunk open switch may cause inconvenience to the user to find the trunk open switch by touch.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art and to provide a multifunctional integration module for mounting in rear of a vehicle capable of improving aesthetic appearance and operation convenience for a user by integrating a rear view camera, a trunk open switch, a license lamp, and the like in an integration module case.

In one aspect, the present disclosure provides a multifunctional integration module for mounting in rear of a vehicle. The multifunctional integration module includes an integration module case which is mounted, being exposed to the outside, in the rear of the vehicle. The multifunctional integration module is integrally mounted with a rear view camera, a trunk open switch, and one or more license lamps in a predetermined arrangement. The rear view camera is fixedly mounted in the integration module case while exposing a lens through a front of the integration module case. The trunk open switch is pressedly mounted on a bottom surface of the integration module case. The one or more license lamps are mounted at sides of the integration module case to irradiate light.

In a preferred embodiment, inside of the integration module case may be mounted with an integration control substrate for controlling electrical signals from the rear view camera, the trunk open switch, and the one or more license lamps.

In another preferred embodiment, the integrated control substrate may be connected to an integrated connector for exchanging signal with an upper controller or receiving power supply at the integration module case.

In still another preferred embodiment, sides of the integrated module case may be formed as an oblique surface to let light irradiation angle of the one or more license lamps head for a license plate at a lower portion thereof.

In yet another preferred embodiment, an upper portion of the integrated module case may be integrally formed with a hook type clip which is fastened to a rear panel of the vehicle in a one-touch fastening manner.

The integrated module case can be mounted at a middle position in a width direction of vehicle body in the rear of the vehicle.

By the above configuration, the present disclosure has the following effects.

First, it is possible to improve the aesthetic appearance and the operation convenience for a user by mounting the multifunctional integration module, in which the rear view camera, the trunk open switch, the license lamps, and the like are integrated, in the rear of the vehicle.

Second, it is possible to further improve the freedom of design of the trunk lid or the tail gate since the multifunctional integration module requires only one mounting space, as compared with the related art in which the license lamps, the rear view camera, the trunk open switch, and the like each occupy different mounting spaces in the rear of the vehicle.

Third, it is possible to improve the aesthetic appearance of the rear of the vehicle since the single multifunctional integration module is mounted at the center in the width direction of the vehicle body, as compared with the related art in which the rear view camera or the trunk open switch is asymmetrically mounted which reduces the aesthetic appearance.

Fourth, it is possible for the user to easily confirm where the multifunctional integration module is visually since the multifunctional integration module is exposed outside the rear of the vehicle, and to easily operate the trunk open switch mounted in the bottom of the multifunctional integration module accordingly.

Other aspects and preferred embodiments of the invention are discussed hereinafter.

It is understood that the term "vehicle" or "vehicular" or other similar term as used herein is inclusive of motor vehicles in general such as passenger automobiles including sports utility vehicles (SUV), buses, trucks, various commercial vehicles, watercrafts including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The above and other features are discussed hereinafter.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

Figure 1:
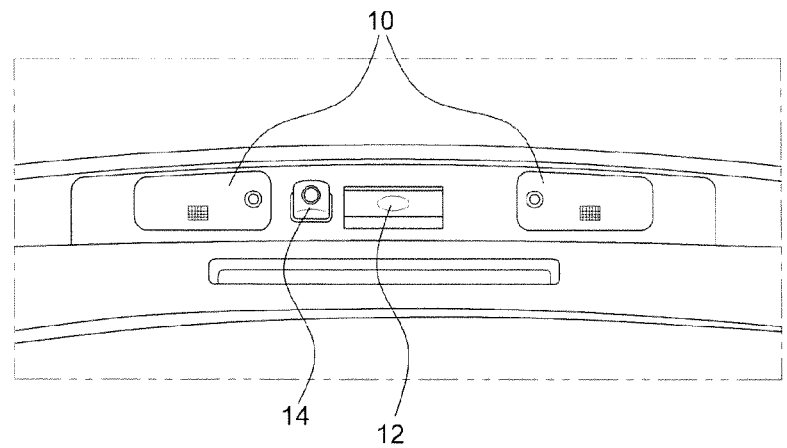
FIGS. 1 to 3 are diagrams illustrating a structure of the related art in which a rear view camera, a trunk open switch, a license lamp, and the like are mounted in a rear of a vehicle.
Figure 2:
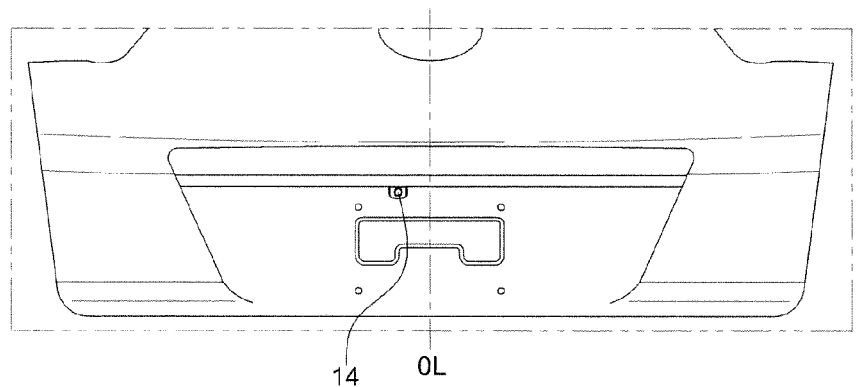
Figure 3:
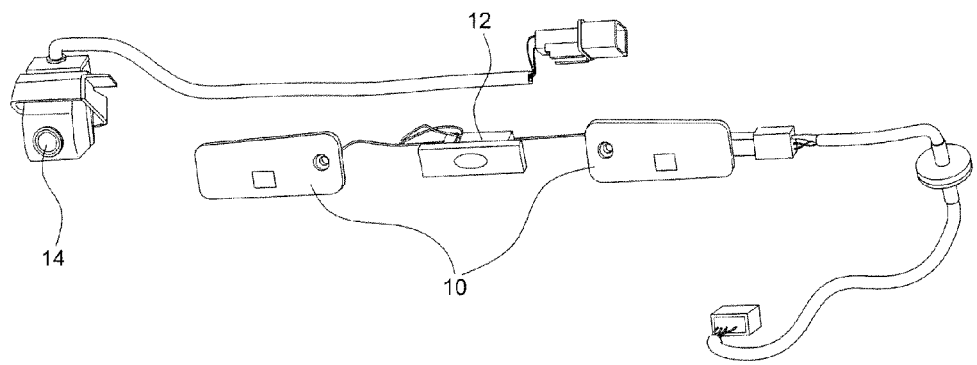
Figure 4:
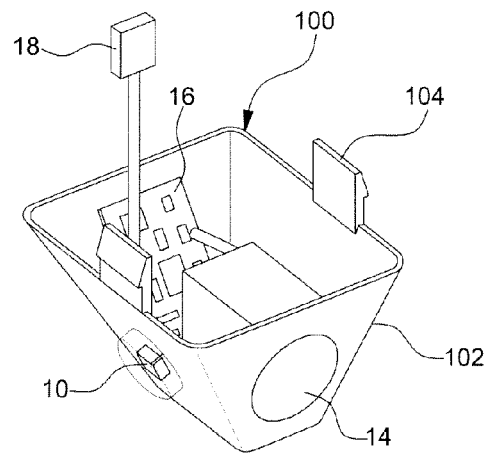
FIG. 4 is a perspective view illustrating a multifunctional integration module for mounting in rear of a vehicle according to an exemplary embodiment of the present invention.
Figure 5:
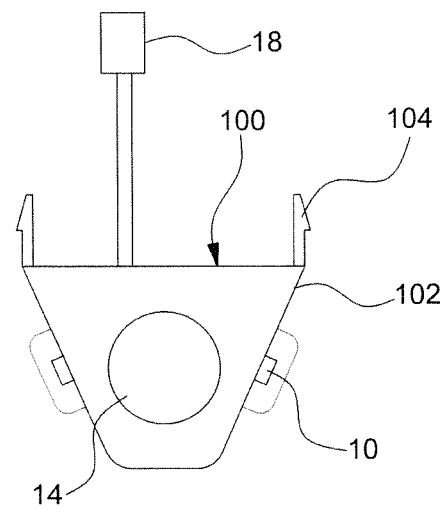
FIG. 5 is a front view illustrating the multifunctional integration module for mounting in rear of a vehicle according to the exemplary embodiment of the present invention.
Figure 6:
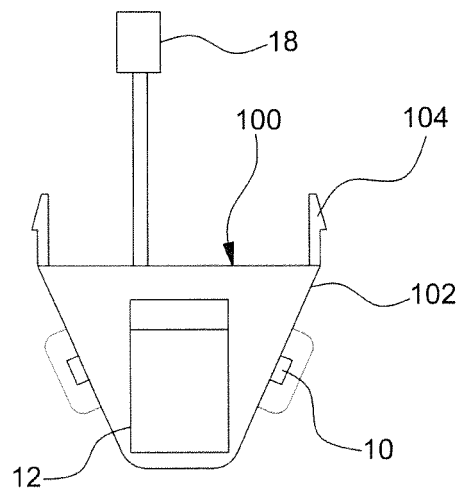
FIG. 6 is a rear view illustrating the multifunctional integration module for mounting in rear of a vehicle according to the exemplary embodiment of the present invention.
Figure 7:
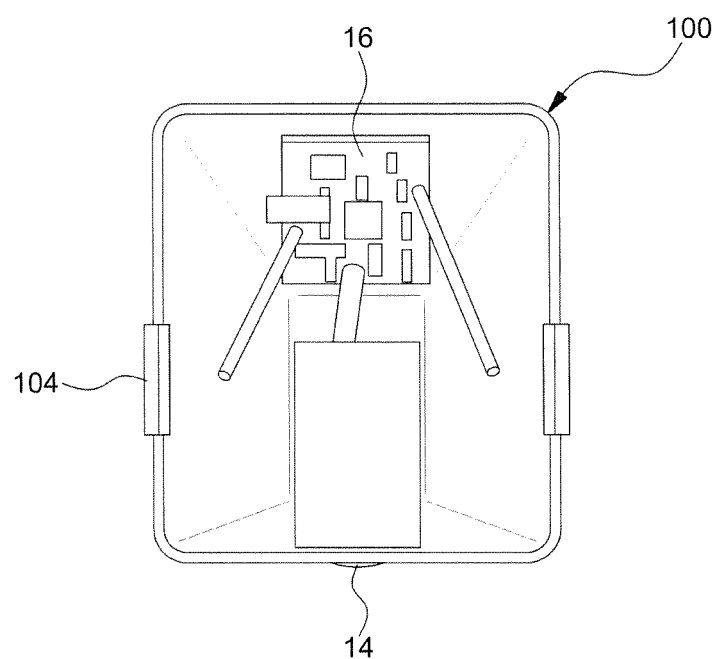
FIG. 7 is a plan view illustrating the multifunctional integration module for mounting in rear of a vehicle according to the exemplary embodiment of the present invention.
Figure 8:
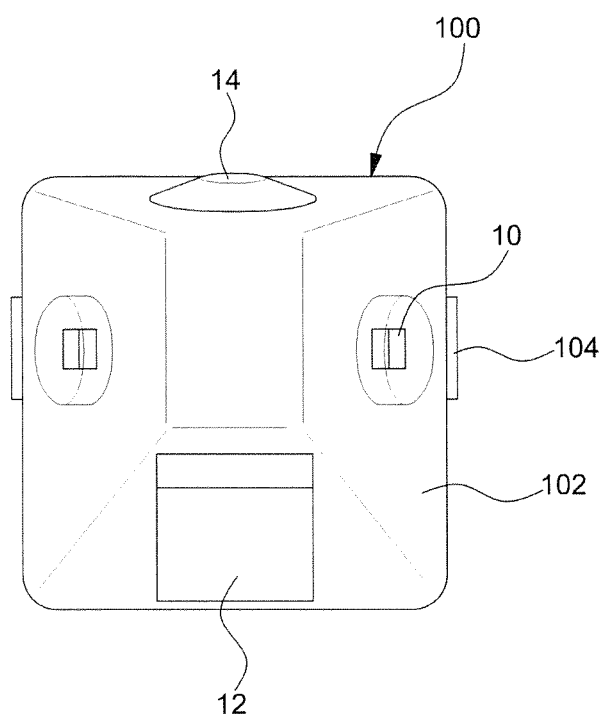
FIG. 8 is a bottom view illustrating the multifunctional integration module for mounting in rear of a vehicle according to the exemplary embodiment of the present invention.
Figure 9:
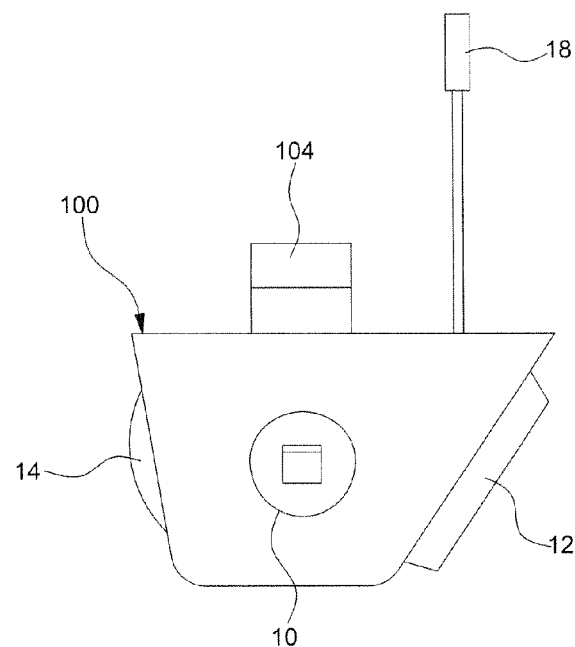
FIG. 9 is a side view illustrating the multifunctional integration module for mounting in rear of a vehicle according to the exemplary embodiment of the present invention.

It should be understood that the appended drawings are not necessarily to scale, presenting a somewhat simplified representation of various preferred features illustrative of the basic principles of the disclosure. The specific design features of the present disclosure as disclosed herein including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present invention, examples of which are illustrated in the accompanying drawings and described below. While the disclosure will be described in conjunction with exemplary embodiments, it will be understood that present description is not intended to limit the invention to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, exemplary embodiments of the present invention will be described in detail with reference to the accompanying drawings.

To help understand the present disclosure, it is to be noted that among terms of the present specification, a multifunctional integration module is modularized by integrating a rear view camera, a trunk open switch, and a license lamp into one.

FIGS. 4 to 9 are six views illustrating a multifunctional integration module for mounting in rear of a vehicle according to an exemplary embodiment of the present invention. In FIGS. 4 to 9, reference numeral 100 illustrates an integration module for integrating a rear view camera, a trunk open switch, and license lamps into one for modularization.

The integration module case 100 is mounted, to be identified visually by the naked eye, at the upper portion of a license plate in rear of a vehicle, in a state in which license lamps 10, a trunk open switch 12, and a rear view camera 14 are integrated in a predetermined arrangement.

For this purpose, the integration module case 100 is molded in a rectangular parallelepiped shape which has a top surface opened and has a wide upper portion but the width narrowing downwardly. Similar to the existing method of protrudedly mounting the camera module, the integration module case 100 may be protrudedly mounted to be identified visually by the naked eye the upper portion of a license plate.

The rear view camera 14 can be fixedly mounted on an inner wall surface of the front side of the integration module case 100 while a lens thereof is exposed through a hole which is formed at the front surface of the integration module case 100.

The trunk open switch 12 can be mounted on the bottom surface of the integration module case 100. Preferably, the trunk open switch 12 is mounted as a small-sized push button type switch which may be pressed in a one-touch manner in consideration of the fact that an inner space of the integration module case 100 is narrow. This switch type can, in addition, further improve operation convenience than the existing turning lever type switch.

The license lamps 10 can be mounted on inner wall surfaces on both sides of the integration module case 100 while lenses of the lamps can be exposed to the outside through irradiation holes which are penetratedly formed on both sides of the integration module case 100.

In this case, considering the fact that the inner space of the integration module case 100 may be narrow, a small-sized LED may be adopted as the license lamp 10.

An inner wall surface of the rear side of the integration module case 100 can be fixedly mounted with a Printed Circuit Board (PCB) type integrated control substrate 16 for controlling electrical signals from the rear view camera, the trunk open switch, and the license lamps and the integrated control substrate 16 can be connected to an integrated connector 18 for exchanging a signal with an upper controller and receiving power supply at the integration module case 100.

Meanwhile, as the integration module case 100 as described above is molded in a rectangular parallelepiped shape which has a wide upper portion with the width narrowing downwardly, both sides thereof are formed as an oblique surface 102 to let a light irradiation angle of the license lamps 10 head for a license plate of a lower side.

By doing so, the lens for irradiating light from the license lamps 10 is positioned on the oblique surface 102 toward the lower portion of the integration module case 100, and therefore the light of the license lamps 10 may be easily irradiated toward the license plate which is positioned at the lower portion thereof.

As such, the integration module case 100 is assembled at the upper portion of the license plate in the rear of the vehicle in the state in which the license lamps 10, the trunk open switch 12, and the rear view camera 14 are integrally mounted in the integration module case 100.

Preferably, a hook type clip 104 which is fastened in a one-touch fastening manner can be integrally and protrudedly formed at the upper portion of the integration module case 100 and inserted into and fastened with the integration module case 100 by being pushed into a fastening hole (not illustrated) which is formed in a rear panel of the vehicle, such that the assembly of the integration module case 100, in which the license lamps 10, the trunk open switch 12, and the rear view camera 14 are integrally mounted, is completed.

Figure 10:
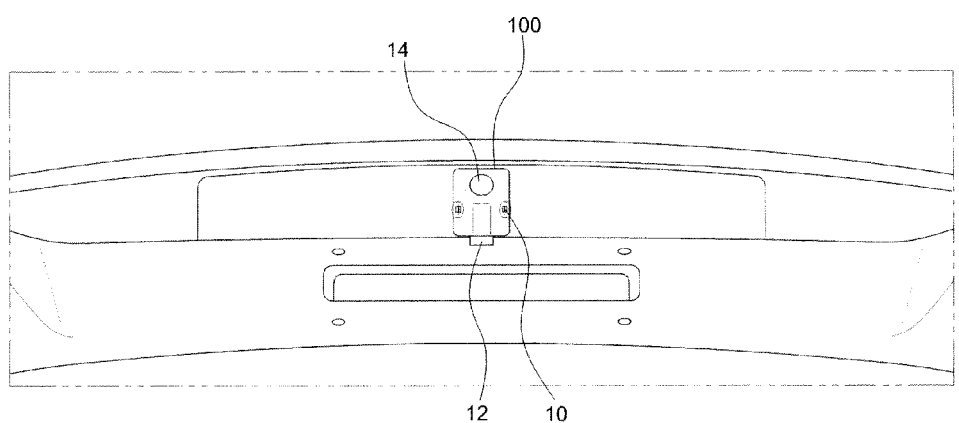
FIG. 10 is a mounting view illustrating an appearance in which the multifunctional integration module according to the exemplary embodiment of the present invention is mounted in the rear of the vehicle.

As such, when the integration module case 100 is mounted in the rear of the vehicle, as illustrated in FIG. 10, the integration module case 100 can be positioned at the center in the width direction of the vehicle body, and thus the aesthetic appearance of the rear surface of the vehicle may be improved, as compared with the related art in which the rear view camera or the trunk open switch may be asymmetrically mounted (as shown in FIG. 1) and thus the aesthetic appearance is reduced.

It is also possible to improve the freedom of design of the trunk lid or the tail gate since the multifunctional integration module occupies only one mounting space which is the position at the center in the width direction of the vehicle body, as compared with the related art in which the license lamps, the rear view camera, the trunk open switch, and the like each occupy different mounting spaces in the rear of the vehicle.

As illustrated in FIG. 10, similar to the existing method of protrudedly mounting the camera module, the integration module case 100 may be protrudedly mounted to be identified visually by the naked eye at the upper portion of the license plate, and thus the user may easily find the position of the integration module case 100 with the naked eye in the daytime or at night and thus may easily find the trunk open switch 12 mounted on the bottom surface of the integration module case 100 accordingly, thereby providing the operation convenience of the trunk open switch.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A multifunctional integration module for mounting in rear of a vehicle, comprising:
    an integration module case which is mounted, being exposed to the outside in the rear of the vehicle and is integrally mounted with a rear view camera, a trunk open switch, and one or more license lamps in a predetermined arrangement,
    wherein the rear view camera is fixedly mounted in the integration module case while a lens thereof is exposed through a front of the integration module case, the trunk open switch is pressedly mounted on a bottom surface of the integration module case, and the one or more license lamps are mounted at sidewalls of the integration module case to irradiate light such that the rear view camera, the trunk open switch, and the one or more license lamps are integrally mounted in the integration module case,
    wherein sides of the integrated module case are oblique surfaces to let light irradiation angle of the one or more license lamps head for a license plate at a lower portion thereof.

2. The multifunctional integration module of claim 1, wherein inside of the integration module case is mounted with an integration control substrate for controlling electrical signals from the rear view camera, the trunk open switch, and the one or more license lamps.

3. The multifunctional integration module of claim 2, wherein the integrated control substrate is connected to an integrated connector for exchanging signal with an upper controller or receiving power supply at the integration module case.

4. The multifunctional integration module of claim 1, wherein an upper portion of the integrated module case is integrally formed with a hook type clip which is fastened to a rear panel of the vehicle in a one-touch fastening manner.

5. The multifunctional integration module of claim 1, wherein the integrated module case is mounted at a middle position in a width direction of vehicle body in the rear of the vehicle.

6. The multifunctional integration module of claim 1, wherein the license lamps are mounted on inner wall surfaces on both sidewalls of the integration module case such that lenses of the one or more license lamps are exposed to an outside of the integration module case through irradiation holes which are penetratedly formed on both sidewalls of the integration module case.

7. The multifunctional integration module of claim 1, wherein the integration module case is formed in a rectangular parallelepiped shape which has a wide upper portion with a width narrowing downwardly, both sidewalls thereof are formed as an oblique surface to let a light irradiation angle of the license lamps head for a license plate of a lower side.

* * * * *